United States Patent
Valmiki et al.

(10) Patent No.: US 7,386,651 B2
(45) Date of Patent: Jun. 10, 2008

(54) SYSTEM, METHOD, AND APPARATUS FOR EFFICIENTLY STORING MACROBLOCKS

(75) Inventors: Ramanujan Valmiki, Bangalore (IN); Sathish Kumar, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 447 days.

(21) Appl. No.: 10/871,656

(22) Filed: Jun. 17, 2004

(65) Prior Publication Data

US 2005/0021902 A1 Jan. 27, 2005

Related U.S. Application Data

(60) Provisional application No. 60/484,830, filed on Jul. 3, 2003.

(51) Int. Cl.
*G06F 12/00* (2006.01)

(52) U.S. Cl. ............... 711/5; 345/543; 345/544; 345/547

(58) Field of Classification Search .......... 711/5
See application file for complete search history.

(56) References Cited

U.S. PATENT DOCUMENTS

| | | | | | |
|---|---|---|---|---|---|
| 5,142,276 | A | * | 8/1992 | Moffat | 345/545 |
| 5,880,786 | A | * | 3/1999 | Oku et al. | 375/240.15 |
| 6,181,632 | B1 | * | 1/2001 | Kondo et al. | 365/230.03 |
| 6,567,556 | B1 | * | 5/2003 | Bramley | 382/233 |
| 2004/0008779 | A1 | * | 1/2004 | Lai et al. | 375/240.16 |
| 2004/0080512 | A1 | * | 4/2004 | McCormack et al. | 345/543 |

* cited by examiner

*Primary Examiner*—Donald Sparks
*Assistant Examiner*—Hashem Farrokh
(74) *Attorney, Agent, or Firm*—McAndrews Held & Malloy, Ltd.

(57) ABSTRACT

Presented herein is a system for storing macroblocks for such that all vertically, horizontally, and diagonally adjacent macroblock are stored in different banks. When fetching a block from a reference frame that overlaps four macroblocks, each of the overlapped macroblocks can be fetched substantially concurrently.

6 Claims, 5 Drawing Sheets

| | Bank 0 | Bank 1 | Bank 2 | Bank 3 |
|---|---|---|---|---|
| 505(0) | A0, A4, A8, A12 | A1, A5, A9, A13 | A2, A6, A10, A14 | A3, A7, A11, A15 |
| 505(1) | A16, A20, A24, A28 | A17, A21, A25, A29 | A18, A22, A26, A30 | A19, A23, A27, A31 |
| 505(2) | A32, A36, A40, A44 | A33, A37, A41, X | A34, A38, A42, B0 | A35, A39, A43, B1 |
| 505(3) | B2, B6, B10, B14 | B3, B7, B11, B15 | B4, B8, B12, B16 | B5, B9, B13, B17 |
| 505(4) | B18, B22, B26, B30 | B19, B23, B27, B31 | B20, B24, B28, B32 | B21, B25, B29, B33 |
| 505(5) | B34, B38, B42, C0 | B35, B39, B43, C1 | B36, B40, B44, C2 | B37, B41, X, C3 |
| 505(6) | C4, C8, C12, C16 | C5, C9, C13, C17 | C6, C10, C14, C18 | C7, C11, C15, C19 |
| : | : | : | : | : |
| : | : | : | : | : |

| Bank 0 | Bank 1 | Bank 2 | Bank 3 |
|---|---|---|---|
| 505(0) | | | |
| 505(1) | | | |
| 505(2) | | | |
| : | | | |
| : | | | |
| 505(n) | | | |

FIGURE 4A

| FETCH 337A | CHARGE BANK 0 | REC. 337A |
|---|---|---|

| FETCH 337B | CHARGE BANK 1 | REC. 337B |
|---|---|---|

| FETCH 337C | CHARGE BANK 2 | REC. 337C |
|---|---|---|

| FETCH | CHARGE BANK 3 | REC. |
|---|---|---|

FIGURE 4B

| A0 | A1 | .................................................. | A43 | A44 |

|  | Bank 0 | Bank 1 | Bank 2 | Bank 3 |
|---|---|---|---|---|
| 505(0) | A0, A4, A8, A12 | A1, A5, A9, A13 | A2, A6, A10, A14 | A3, A7, A11, A15 |
| 505(1) | A16, A20, A24, A28 | A17, A21, A25, A29 | A18, A22, A26, A30 | A19, A23, A27, A31 |
| 505(2) | A32, A36, A40, A44 | A33, A37, A41, X | A34, A38, A42, B0 | A35, A39, A43, B1 |
| 505(3) | B2, B6, B10, B14 | B3, B7, B11, B15 | B4, B8, B12, B16 | B5, B9, B13, B17 |
| 505(4) | B18, B22, B26, B30 | B19, B23, B27, B31 | B20, B24, B28, B32 | B21, B25, B29, B33 |
| 505(5) | B34, B38, B42, C0 | B35, B39, B43, C1 | B36, B40, B44, C2 | B37, B41, X, C3 |
| 505(6) | C4, C8, C12, C16 | C5, C9, C13, C17 | C6, C10, C14, C18 | C7, C11, C15, C19 |
| ⋮ | ⋮ | ⋮ | ⋮ | ⋮ |

SYSTEM, METHOD, AND APPARATUS FOR EFFICIENTLY STORING MACROBLOCKS

RELATED APPLICATIONS

This application claims priority to Provisional App. Ser. No. 60/484,830, filed Jul. 3, 2003, entitled "SYSTEM, METHOD, AND APPARATUS FOR EFFICIENTLY STORING MACROBLOCKS", which is incorporated herein by reference in its entirety for all purposes.

This application is related to Provisional App. Ser. No. 60/484,512, filed Jul. 2, 2003, entitled "SYSTEM, METHOD, AND APPARATUS FOR EFFICIENTLY STORING MACROBLOCKS IN SD-RAM", and Provisional Application Ser. No. 60/495,405, filed Aug. 15, 2003, entitled "STORING MACROBLOCKS FOR CONCATENATED FRAMES", each of which are incorporated by reference in their entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One of the major challenges in designing a memory subsystem is organizing data in such a way, as to enable efficient memory access that would increase the system throughput. Data organization in the memory becomes even more of a bigger challenge in a UMA (Unified Memory Architecture) subsystem, where it has a direct impact on the efficiency of the system as a whole. Therefore data in the memory should be organized in such a way that, a high bandwidth client (a client is an agent that initiates data transfer between itself and the memory subsystem) benefits the most without compromising the access efficiency of the other low bandwidth clients. In other words, the data organization in the memory should help reduce the DDR-SDRAM overheads for high bandwidth clients, which in turn would improve the efficiency of the memory subsystem as a whole.

In a video decompression-engine (a.k.a video decoder) a substantial portion of the system bandwidth is utilized in transacting video pixel data. The video decoder uses the neighboring macro-block (a macro block is a 16×16 pixel block) data from the previous and future frames of the video to predict the current macro-block information. Thus the right choice would be to have a memory subsystem that is macro-block oriented.

However the current column sizes in the DDR-SDRAM technology do not allow the packing of a full macro-block row of information in one bank of the DRAM for a SD size picture. At the same time, a very simple linear arrangement of macro-block continuously in the same bank of the DDR-SDRAM would increase the SDRAM overheads, as an adjacent or vertical neighbor macro-block fetch would require a different row of the same bank to be activated. In such a case, the current row of the current bank needs to be precharged and a new row of the same bank needs to be activated, thus resulting in roughly 6-clocks overhead per row change. In the worst case, a particular video decode fetch could involve four macro-blocks worth data, lying in four different rows of the same bank, resulting in as high as 18 (three row switching) clocks overhead. On the other hand, if the adjacent or vertical macro-block were to exist in different banks of the DRAM, it would be possible to reduce the SDRAM overhead to zero in the best case and the worst case numbers will be much less that 18 clocks.

Conventionally, four macro blocks worth of data are packed into one bank, before switching to the next bank of the DDR-SDRAM. This packing would be efficient for images, whose number of horizontal macro-block (NMBX) follows the equation, $$NMBX = 16*N + 8$$

(where N is any positive integer)

The above equation ensures efficient data fetching and packing for a HD size picture (NMBX=120). However for a SD size picture (NMBX=45), the closest value of N, that satisfies the above equation=4, resulting in NMBX required=56. This means we have 11 macro-blocks, wasted for every macro-block row of the image. For a SD size picture this would be roughly 75 Kbytes of wasted memory per frame storage (roughly 20% wastage per frame).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

System(s), method(s), and apparatus for efficiently storing macroblocks are presented herein.

In one embodiment, there is presented a method for storing a plurality of blocks representing portions of a frame. The method comprises storing the plurality of blocks in a plurality of banks, wherein every two vertically adjacent blocks are stored in different ones of the banks from one another.

In another embodiment, there is presented a method for storing a plurality of rows of blocks. The method comprises storing each of a first sequence of blocks of a first row in particular ones of a plurality of banks according to a particular order, starting at a first and then a second of the plurality of banks, and storing each of the blocks of a next row in particular ones of the plurality of banks according to the particular order, starting at a third and then a fourth of the plurality of banks.

In another embodiment, there is presented a method for decoding a macroblock. The method comprises displacing a position associated with the macroblock with one or more motion vectors, resulting in a displaced region for a reference frame, retrieving a first macroblock of the reference frame that overlaps the displaced region, retrieving a second macroblock of the reference frame that overlaps the displaced region, while retrieving the first macroblock, retrieving a third macroblock of the reference frame that overlaps the displaced region, while retrieving the first macroblock, and retrieving a fourth macroblock of the reference frame that overlaps the displaced region, while retrieving the first macroblock.

In another embodiment, there is presented a system for storing a plurality of blocks representing portions of a frame. The system comprises a plurality of banks and a video decoder. The plurality of banks store the plurality of blocks, wherein every two vertically adjacent blocks are stored in different ones of the banks from one another. The video decoder writes the plurality of blocks to the plurality of banks.

In another embodiment, there is presented a system for storing a plurality of rows of blocks. The system comprises a plurality of banks and a video decoder. The plurality of banks store each of first sequence of blocks of a first row in particular ones of a plurality of banks, and for storing each of the blocks of a next row in particular ones of the plurality of banks. The video decoder writes the first sequence of blocks according to a particular order, starting at a first and then a second of the plurality of banks and writing each of the blocks of the next row according to the particular order, starting at a third and then a fourth of the plurality of banks.

In another embodiment, there is presented a circuit for decoding a macroblock. The circuit comprises a controller and an instruction memory operably connected to the controller. The instruction memory stores executable instructions. The execution of the executable instructions by the controller causes displacing a position associated with the macroblock with one or more motion vectors, resulting in a displaced region for a reference frame, retrieving a first macroblock of the reference frame that overlaps the displaced region, retrieving a second macroblock of the reference frame that overlaps the displaced region, while retrieving the first macroblock, retrieving a third macroblock of the reference frame that overlaps the displaced region, while retrieving the first macroblock, and retrieving a fourth macroblock of the reference frame that overlaps the displaced region, while retrieving the first macroblock.

These and other advantages and novel features of the present invention, as well as details of an illustrated embodiment thereof, will be more fully understood from the following description and drawings.

DETAILED DESCRIPTION OF THE INVENTION

Figure 1:
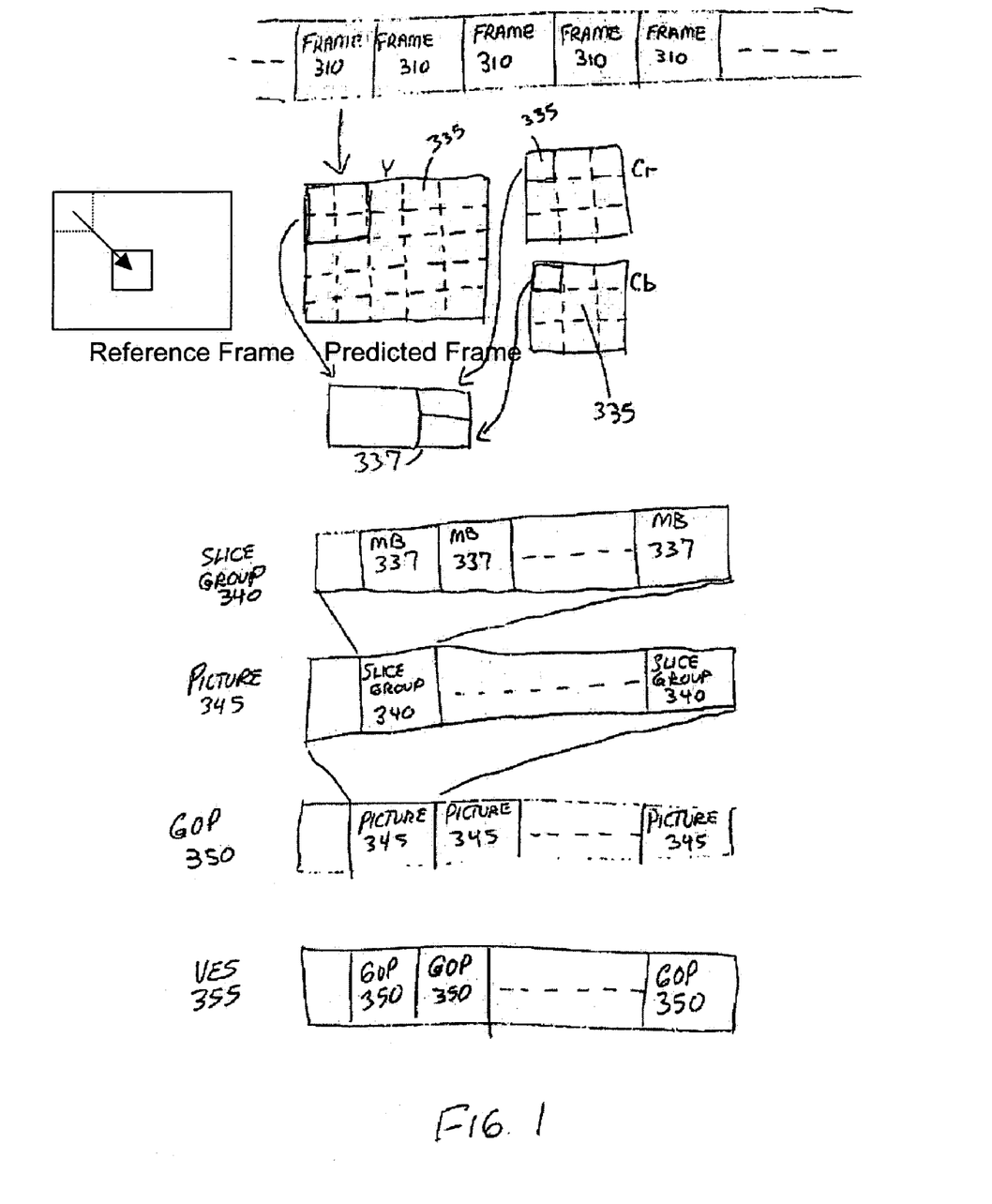
FIG. 1 is a block diagram describing the encoding of video data.

Referring now to FIG. 1, there is illustrated a block diagram describing MPEG formatting of video data 305. The video data 305 comprises a series of frames 310. Each frame comprises two dimensional grids of luminance Y, chroma red Cr, and chroma blue Cb pixels 315. The two-dimensional grids are divided into 8×8 blocks 335, where four blocks 335 of luminance pixels Y are associated with a block 335 of chroma red Cr, and a block 335 of chroma blue Cb pixels. The four blocks of luminance pixels Y, the block of chroma red Cr, and the chroma blue Cb form a data structure known as a macroblock 337. The macroblock 337 also includes additional parameters, including motion vectors.

The data in the macroblocks 337 is compressed in accordance with algorithms that take advantage of temporal and spatial redundancies. For example, in a motion picture, neighboring frames 310 usually have many similarities. Motion between frames increases differences between frames. Motion compensation can be used to reduce these differences. When an object moves across a screen, the object may appear in different positions in different frames, but the object does not change substantially in appearance. The picture differences can be reduced by measuring and recording the motion as a vector. The vector can be used during decoding to shift a macroblock 337 of one frame to a more appropriate part of another frame.

Accordingly, most of the macroblocks 337 are compared to portions of other frames 310 (reference frames). When an appropriate portion of a reference frame 310 is found, the differences between the portion of the other frame 310 and the macroblock 337 are encoded. The location of the portion in the reference frame 310 is recorded as a motion vector. The encoded difference and the motion vector form part of the data structure encoding the macroblock 337. In MPEG-2, the macroblocks 337 from one frame 310 (a predicted frame) are limited to prediction from portions of, no more than two reference frames 310. It is noted that frames 310 used as a reference frame 310 for a predicted frame 310 can be a predicted frame 310 from another reference frame 310.

The macroblocks 337 representing a frame are grouped into different slice groups 340. The slice group 340 includes the macroblocks 337 in the slice group 340, as well as additional parameters describing the slice group. Each of the slice groups 340 forming the frame form the data portion of a picture structure 345. The picture 345 includes the slice groups 340 as well as additional parameters. The pictures are then grouped together as a group of pictures 350. The group of pictures 350 also includes additional parameters. Groups of pictures 350 are then stored, forming what is known as a video elementary stream 355. The video elementary stream 355 is then packetized to form a packetized elementary sequence 360. Each packet is then associated with a transport header 365a, forming what are known as transport packets 365b.

The transport packets 365b can be multiplexed with other transport packets 365b carrying other content, such as another video elementary stream 355 or an audio elementary stream. The multiplexed transport packets form what is known as a transport stream. The transport stream is transmitted over a communication medium for decoding and presentation.

Figure 2:
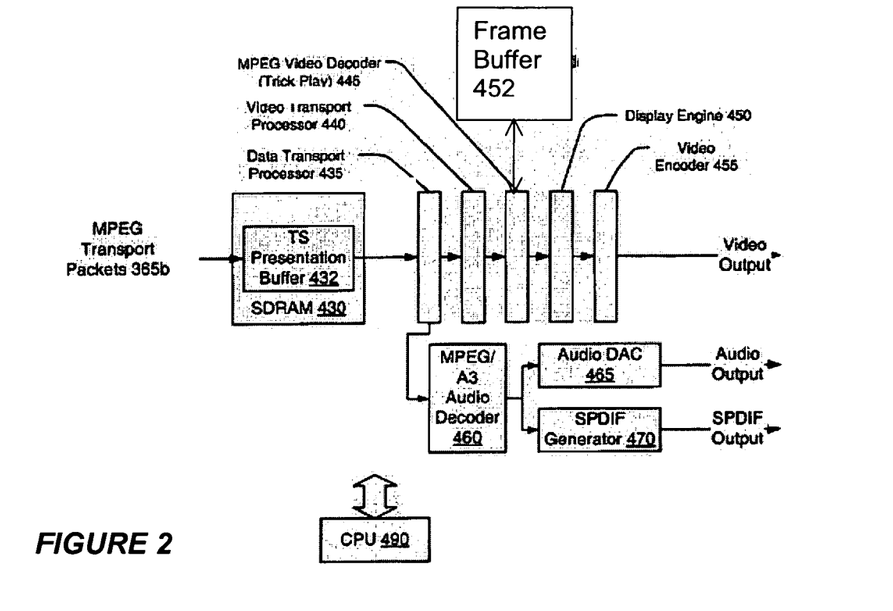
FIG. 2 is a block diagram of a decoder system in accordance with an embodiment of the present invention.

Referring now to FIG. 2, there is illustrated a block diagram of an exemplary decoder system for decoding compressed video data, configured in accordance with an embodiment of the present invention. A processor, that may include a CPU 490, reads transport stream 465 into a transport stream buffer 432 within an SDRAM 430.

The data is output from the transport stream buffer 432 and is then passed to a data transport processor 435. The data transport processor 435 then demultiplexes the transport stream 465 into constituent transport streams. The constituent packetized elementary stream can include for example, video transport streams, and audio transport streams. The data transport processor 435 passes an audio transport stream to an audio decoder 460 and a video transport stream to a video transport processor 440.

The video transport processor 440 converts the video transport stream into a video elementary stream and provides the video elementary stream to a video decoder 445. The video decoder 445 decodes the video elementary stream, resulting in a sequence of decoded video frames. The decoding can include decompressing the video elementary stream. It is noted that there are various standards for compressing the amount of data required for transportation and storage of video data, such as MPEG-2. The video decoder 445 decompresses the video data.

A display engine 450 is responsible for and operable to select a frame (or field) for display at every vertical synchronization pulse, scale the frame, render the graphics, construct the complete display, and rasterize the frame, among other functions. The rasterized frame is passed to a video encoder 455 where it is converted to analog video using an internal digital to analog converter (DAC). The digital audio is converted to analog in the audio digital to analog converter (DAC) 465.

The decoded video data includes a series of frames 310. The frames 310 are stored in frame buffers 452. The frame buffers 452 can be dynamic random access memory (DRAM) comprising 128 bit/16 byte gigantic words (gwords). As noted above, most macroblocks 337 in predicted frames 310 are encoded as an offset or difference from portions of reference frames 310. Accordingly, the MPEG video decoder 445 decodes the reference frames 310 prior to decoding predicted frames 310 that are predicted thereon. The decoded reference frames 310 are stored in frame buffers 452. The MPEG video decoder 445 fetches the portions of the reference frames 310 from the frame buffers 452 to decode macroblocks 337 from the predicted frame 310.

Figure 3:
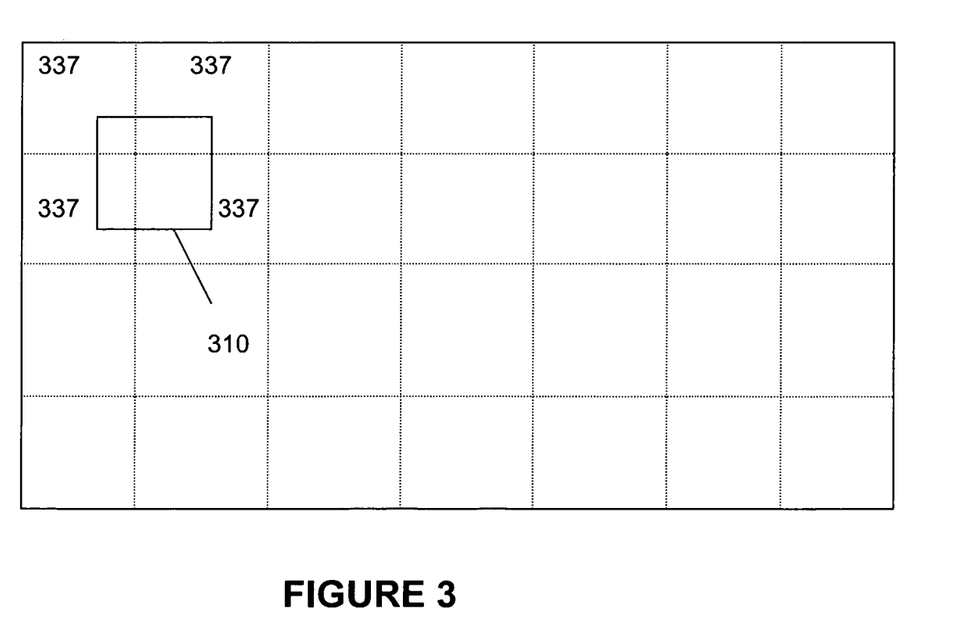
FIG. 3 is a block diagram of an exemplary reference frame.

Referring now to FIG. 3, there is illustrated a block diagram of a reference frame 310. As noted above, the frame 310 is decoded on a macroblock by macroblock 337 basis. Macroblocks 337 of another frame 310 can be encoded as an offset or difference from portions 310p of the frame 310. The portions 310p are not necessarily aligned with macroblocks 337. A portion 310p can potentially straddle four adjacent macroblocks 337a, 337b, 337c, 337d. The MPEG video decoder 445 retrieves the macroblocks 337a, 337b, 337c, 337d, containing the portion 310 for decoding a macroblock 337 in a predicted frame 310.

Figure 4A:
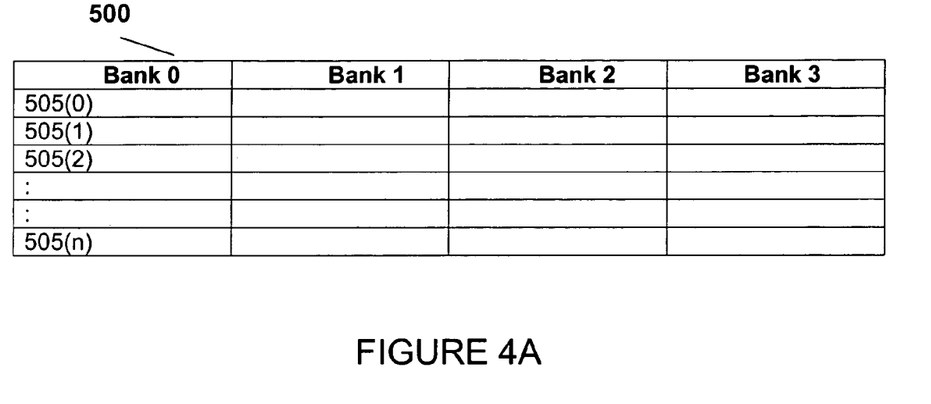
FIG. 4A is a block diagram of an exemplary DRAM.

Referring now to FIG. 4A, there is illustrated a block diagram of an exemplary DRAM 500. The DRAM 500 comprises four banks, namely bank 0, bank 1, bank 2, and bank 3. Each bank comprises any number of rows 505(0) . . . 505(n). Each row of a bank has 32 byte jumbo words (jword). The luma Y portion of the macroblocks 337 occupy 8 j-words. Therefore, each row of a bank can store the luma pixels from four macroblocks 337.

To access data, a bank is charged. While the bank is charged, data from one row of the bank can be accessed. Access to other rows of the bank occurs after the first access is completed. Each memory access is associated with overhead time. As noted above, for decoding a macroblock 337, the video decoder 445 may fetch up to four adjacent macroblocks. The time for decoding can be reduced by fetching the macroblocks 337 in parallel or in pipeline. However, if the macroblocks 337 occupy different rows of the same bank, the requests cannot occur in parallel or pipeline with many DRAMS. To avoid this, the frame 310 can be stored in a frame buffer 452 in a manner such that every set of four covering macroblocks 337 are stored in either different banks or the same row of a bank. Accordingly, the video decoder 445 can fetch any portion 310p by fetching the macroblocks 337 overlapped by the portion 310p either in parallel or in pipeline fashion.

Figure 4B:
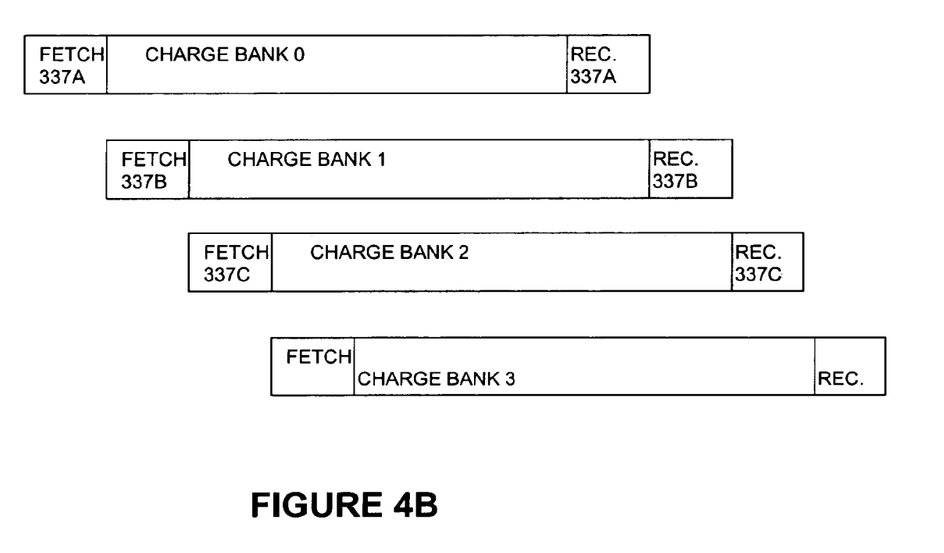
FIG. 4B is a block diagram describing the substantially concurrent retrieval of multiple macroblocks in accordance with an embodiment of the present invention.

Referring now to FIG. 4B, there is illustrated a graph describing the retrieval of a second, third, and fourth macroblock during retrieval of a first macroblock from a reference frame in accordance with an embodiment of the present invention. The graph will be described with references to FIGS. 3 and 4A. While decoding a frame, the video decoder 445 decodes a particular macroblock of the frame. The macroblock 337 is encoded as an offset to a portion 310 of a reference frame. The portion 310 of the reference frame overlaps macroblocks 337a, 337b, 337c, and 337d. Macroblock 337a can be stored in bank 0, macroblock 337b can be stored in bank 1, macroblock 337c can be stored in bank 2, and macroblock 337d can be stored in bank 3.

Accordingly, the video decoder 445 can retrieve macroblock 337a, and also retrieve macroblocks 337b, 337c, and 337d while retrieving macroblock 337a. The retrieval of macroblock 337a is commenced by issuance of a command to fetch the macroblock 337a from bank 0. Subsequent thereto, bank 0 charges. Charging bank 0 can take six clock cycles, depending on the frame buffer memory. The video decoder 445 issues a command to fetch the macroblock 337b from bank 1, immediately after issuance of the command to fetch macroblock 337a from bank 0, and while bank 0 is charging. The video decoder 445 then issues a command to fetch the macroblock 337c from bank 2, immediately after issuance of the command to fetch macroblock 337b from bank 1, and while banks 0 and 1 are charging. Finally, the video decoder 445 can issue a command to fetch the macroblock 337d from bank 3, immediately after issuance of the command to fetch macroblock 337c from bank 2, and while banks 0, 1 and 2 are charging.

At a certain time period, the banks 0, 1, 2, and 3 finish charging and providing the requested macroblocks, macroblocks 337a, 337b, 337c, and 337d. In general, the charging period is substantially larger than the time for issuance of the fetch instruction and receiving the requested macroblocks. Accordingly, substantial time savings are realized because the charging times for the banks 0, 1, 2, and 3 are substantially concurrent.

Figure 5:
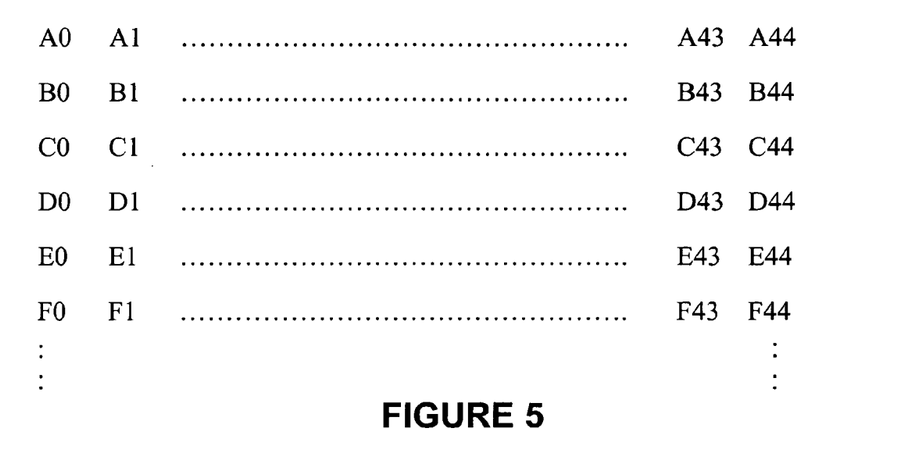
FIG. 5 is a block diagram of an exemplary SDTV frame.

Referring now to FIG. 5, there is illustrated a block diagram of an exemplary decoded standard definition TV (SDTV) reference frame 310. The reference frame 310 can be divided into macroblocks, A0 . . . A44, B0 . . . B44, C0 . . . C44, D0 . . . D44, E0 . . . E44, F0 . . . F44, etc. The macroblocks comprise 16×16 blocks of luma pixels and two 8×8 blocks of chroma pixels. An SDTV reference frame comprises 45 macroblocks, e.g., A0 . . . A44, across each row.

Figure 6:
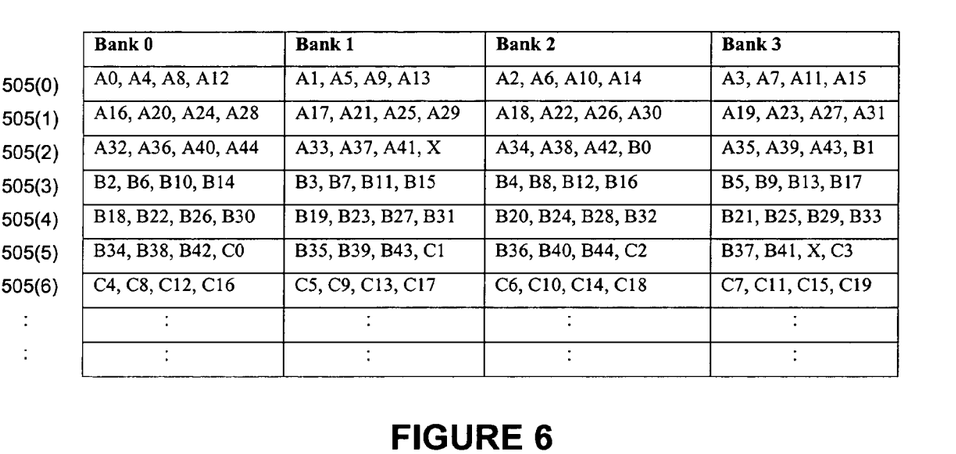
FIG. 6 is a block diagram describing the storage of an SDTV frame in accordance with an embodiment of the present invention.

Referring now to FIG. 6, there is illustrated a block diagram of an exemplary frame buffer storing a frame in accordance with an embodiment of the present invention. The frame buffer comprises four banks, bank 0, bank 1, bank 2, and bank 3. Each bank has any number of rows 505, indicated by the rows in the table. Each row of each bank can store 4 macroblocks.

The video decoder 445 stores a macroblock row, e.g., macroblocks A0 . . . A44, by storing the first macroblock, A0, in a row 505, e.g., row 505(0), of bank 0, storing the next macroblock, A1, in the same row of bank 1, the next macroblock, A2, in the same row of bank 2, and the next macroblock, A3, in the same row of bank 3. After storing a macroblock in the last bank, e.g., bank 3, the video decoder 445 checks if the row 505(0) is filled and cannot store additional macroblocks. If the row is not filled and can store additional macroblocks, the video decoder 445 returns the first bank, e.g., bank 0, and repeats the foregoing. However, if the row is filled and cannot store additional macroblocks, the video decoder 445 proceeds the next row, e.g., row 505(1). For example, after storing macroblock A15 in row 505(0) of bank 3, row 505(0) of bank 505(0) of bank 0 is filled and cannot store macroblock A16.

When the last macroblock of the macroblock row, e.g., macroblock A44, is stored (in row 505(2) of bank 0), the video decoder 445 proceeds to the next macroblock row, e.g., B0 . . . B44. The first macroblock of the next row, e.g., macroblock B0 is vertically adjacent to the first macroblock of the previous row, e.g., macroblock A0, and diagonally adjacent to the second macroblock of the previous row, e.g., macroblock A1. Accordingly, the contiguous portion 310$p$ can cover macroblock A0, A1, B0, and B1. Accordingly, B0 and B1 should not be stored in either of the banks storing A0 and A1, e.g., banks 0 and 1. Macroblocks B0 and B1 should be stored in banks 2 and 3, respectively. However, the last macroblock of the previous row, e.g., macroblock A44, is stored in bank 0, making the next bank, bank 1. Accordingly, the video decoder 445 stuffs a blank macroblock X in row 505(2) for each bank in the order between the bank storing the last macroblock of the previous row, bank 0, and bank 2. The bank(s) between bank 0 and bank 2, is bank 1. Accordingly, the video decoder 445 stuffs a blank macroblock X in bank 1.

The video decoder 445 proceeds to decode and store the next macroblock row B0 . . . B44, starting from row 505(2) in bank 2 and rotating to bank 3, bank 0, bank 1, bank 2, and again bank 3, and proceeding to the next rows 505 when the current row is filled. At the end of the macroblock row B0 . . . B44, the video decoder 445 proceeds to macroblock row C0 . . . C44. The video decoder 445 stuffs blanks in each bank between the bank storing the last macroblock of the previous row, e.g. macroblock B44 in bank 2, and bank 0, and begins storing macroblock row C0 . . . C44 in bank 0. The video decoder 445 repeats the foregoing for each of the macroblock rows in the frame. Each macroblock row is stored starting in either bank 0 or bank 2, in alternating fashion, such that each macroblock rows starts in a different one of bank 0 and bank 2 from its neighboring macroblock rows. For example, macroblock row B0 . . . B44 starts in bank 2, while macroblock rows A0 . . . A44, and C0 . . . C44 start in bank 0.

Figure 7:
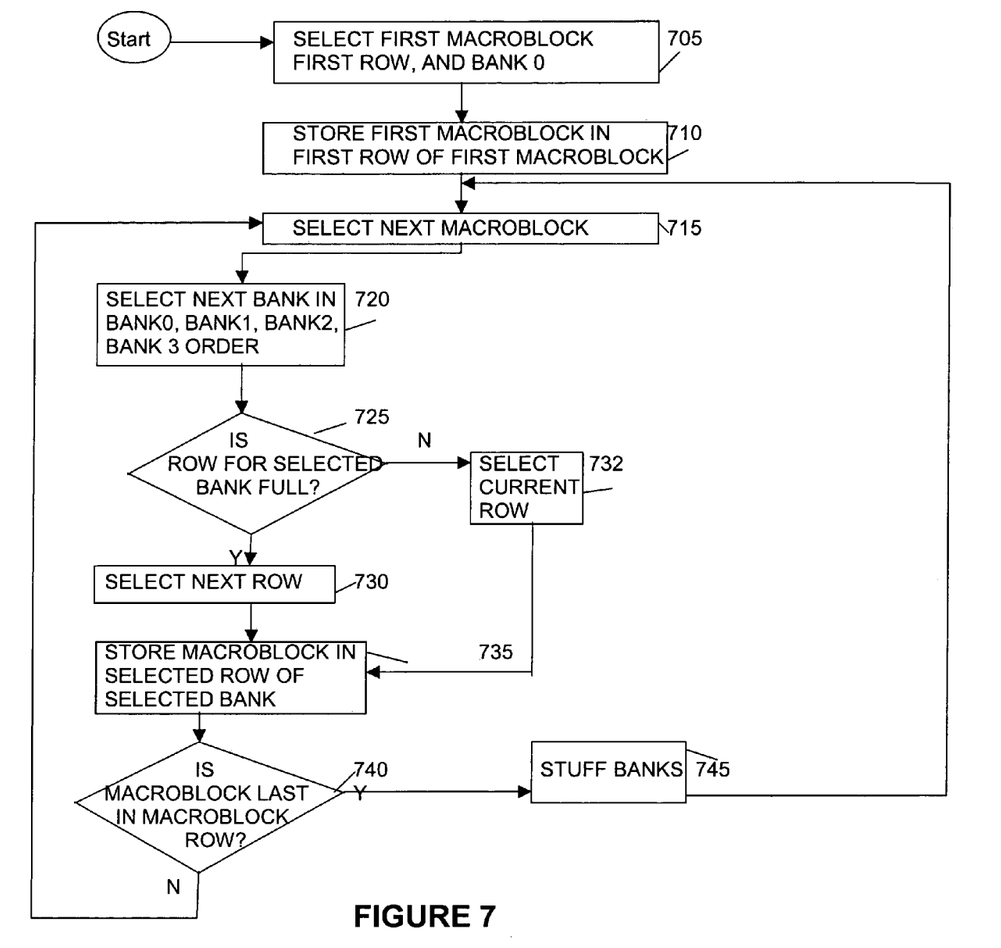
FIG. 7 is a flow diagram for storing a frame in accordance with an embodiment of the present invention.

Referring now to FIG. 7, there is illustrated a flow diagram describing the storage of a frame in accordance with an embodiment of the present invention. At 705, the video decoder 445 selects the first macroblock of the frame, the first row, and the first bank, e.g., bank 0. At 710, the video decoder stores the first macroblock selected during 705 in the row and bank selected during 705.

The video decoder 445 selects the next macroblock at 715, and the next bank in the bank 0, bank 1, bank 2, and bank 3 order at 720. At 725, the video decoder 445 determines whether the current row for the selected bank is full. If the current row for the selected bank is full, the video decoder 445 selects the next row at 732. Otherwise, video decoder 445 bypasses 732.

At 735, the video decoder 445 stores the macroblock in the selected row of the selected bank. At 740, the video decoder 445 determines if the macroblock is the last macroblock row in the block. If the macroblock is not the last macroblock row in the block, the video decoder 445 repeats 715-740.

If the macroblock is the last macroblock in the macroblock row during 740, the video decoder 445 proceeds stuffing the banks (745) with blank macroblocks in the bank order until the bank storing the third macroblock (A2, B2, C2, etc.). The video decoder 445 then repeats 715-745 for the next macroblock row.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for storing a plurality of rows of blocks, said method comprising:
    storing each of a first sequence of blocks of a first row in particular ones of a plurality of banks according to a particular order, starting at a first and then a second of the plurality of banks;
    storing each of the blocks of a next row in particular ones of the plurality of banks according to the particular order, starting at a third and then a fourth of the plurality of banks, wherein the first sequence and the second sequence comprise a first block and a second block, through a last macroblock, and wherein storing each of the first sequence further comprises:
    storing the first macroblock in the first sequence in the first bank;
    storing the second macroblock in the first sequence in the second bank; and
    storing the last macroblock of the first sequence in a particular one of the plurality of banks according to the particular order;
    the method further comprising:
    stuffing each bank starting from the bank following the particular one of the plurality of banks to the second bank in the particular order.

2. The method of claim 1, wherein stuffing further comprises:
    storing a blank block.

3. The method of claim 1, wherein the particular order comprises repeating the first bank followed by the second bank, followed by the third bank, followed by the fourth bank.

4. A system for storing a plurality of rows of blocks, said system comprising:
    a plurality of banks for storing each of a first sequence of blocks of a first row in particular ones of a plurality of banks, and for storing each of the blocks of a next row in particular ones of the plurality of banks; and a video decoder for writing the first sequence of blocks according to a particular order, starting at a first and then a second of the plurality of banks and writing each of the blocks of the next row according to the particular order, starting at a third and then a fourth of the plurality of banks, wherein the first sequence and the second sequence comprise a first block and a second block, through a last macroblock, the plurality of banks storing the first macroblock in the first sequence in the first bank and storing the second macroblock in the first sequence in the second bank and storing the last macroblock of the first sequence in a particular one of the plurality of banks according to the particular order, and wherein the video decoder stuffs each bank starting from the bank following the particular one of the plurality of banks to the second bank in the particular order.

5. The system of claim 4, wherein the video decoder stuffs a bank by storing a blank block.

6. The system of claim 4, wherein the particular order comprises repeating the first bank followed by the second bank, followed by the third bank, followed by the fourth bank.

* * * * *